UNITED STATES PATENT OFFICE.

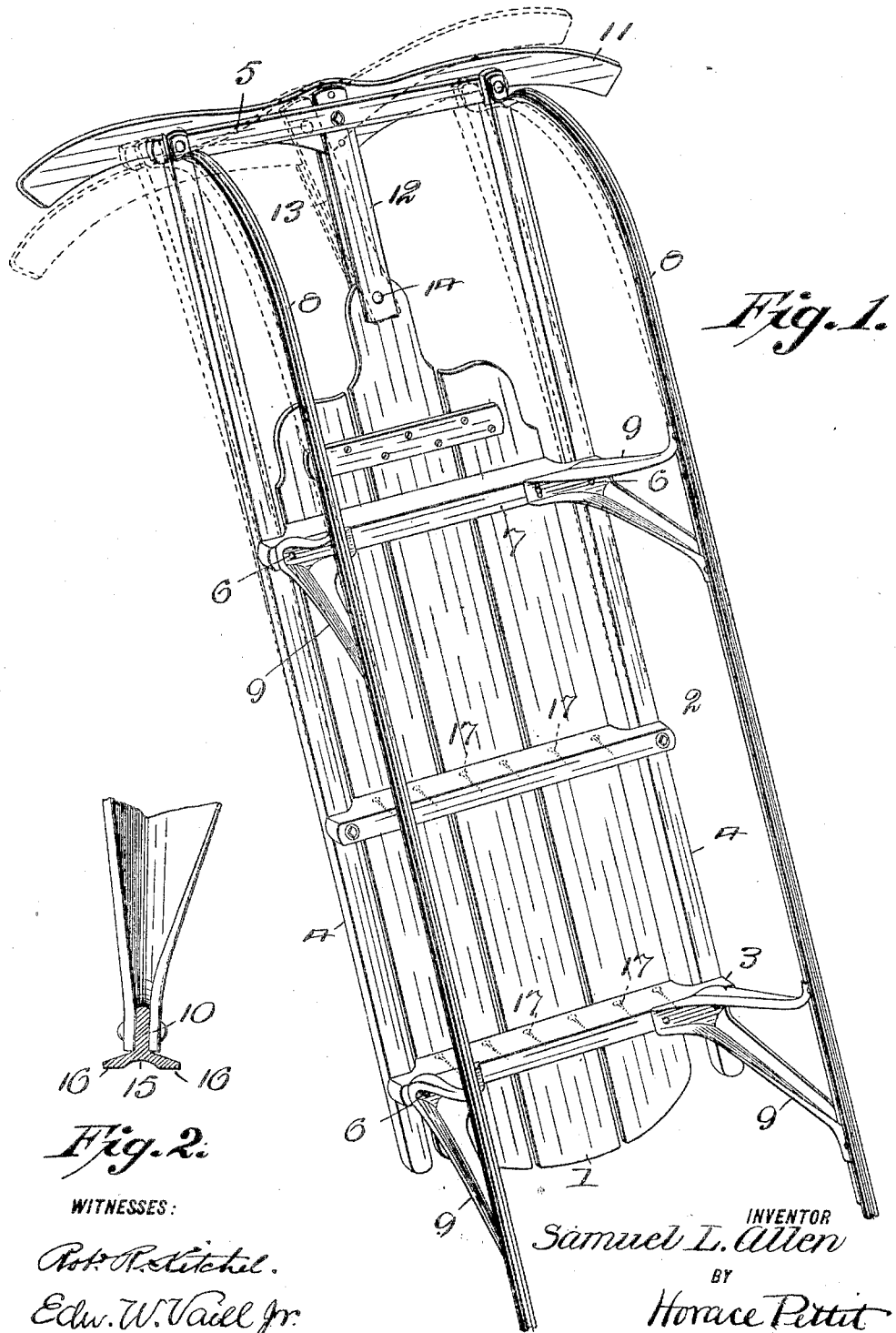

SAMUEL L. ALLEN, OF MOORESTOWN, NEW JERSEY

SLED.

No. 797,165. Specification of Letters Patent. Patented Aug. 15, 1905.

Application filed December 7, 1904. Serial No. 235,792.

*To all whom it may concern:*

Be it known that I, SAMUEL L. ALLEN, a citizen of the United States, and a resident of Moorestown, county of Burlington, State of New Jersey, have invented certain new and useful Improvements in Sleds, of which the following is a full, clear, and complete disclosure.

The object of my invention is to improve the constructions of sleds and similar vehicles, and particularly that of the type of sled which is steered by bending the runners laterally, so as to cause the sled to traverse a curved path.

The features of invention are particularly applicable to sleds made similar to that of my prior patent, No. 408,681, issued August 13, 1889, said patent being for a sled which is of the type above mentioned having bendable runners.

Briefly, my invention comprises the embodiment in the runners of a sled or similar vehicle of means which will produce a transverse gripping action to prevent the sled from slipping sidewise and to keep the runners more accurately in the path which it is desired to pass over or follow, thereby greatly facilitating the control of the sled, and comprises also the arrangement of the side bars or side rails, the top, and the runners.

Practical experience and tests have proved that the ordinary flat runner does not allow a sled with bendable runners to steer with sufficient accuracy on hard surfaces of snow and ice. A runner with a groove or grooves occupying its whole width allows the sled to be steered almost perfectly, but owing to sharp edges tends to retard the speed of the sled. By combining flat surfaces in the runners with grooves the guiding feature is preserved, while at the same time the sharp edges are eliminated and a bearing-surface is provided which does not penetrate the snow or ice to such a great extent.

For a full, clear, and exact description of this form of my invention reference may be had to the accompanying drawings, forming part of this specification, in which—

Figure 1 is a perspective view of the under side of a sled embodying my improvements. Fig. 2 is a transverse sectional view of one of the runners, showing one form of the bearing-surface thereof.

Referring to the said drawings, the numeral 1 indicates the top or body portion of the sled, which is composed of longitudinal slats or strips, said slats being held together by transverse benches or cleats 2 and 3, to which said slats are nailed or otherwise secured, as indicated at 17. Connected to the ends of the benches 2 and 3 are side bars or rails 4, which extend the entire length of the sled and which are connected at their forward ends by means of a transverse bar 5. Said longitudinal bars or rails 4 are pivoted, as at 6, to a third transverse cleat 7, said cleat being unconnected with the slats which form the top of the sled, said slats being allowed merely to rest upon the upper side of said cleat. The runners 8 are connected at their forward upturned ends with the longitudinal bars 4 and are supported in the correct relation to said bars 4 by a series of legs or braces 9. The runners 8 are preferably made in the form of angle-irons or bars having an inverted-T-shape cross-section, as indicated at 10. To the center of the forward cross-bar 5 is pivoted a lever 11, the ends of which project beyond the sides of the sled and are adapted to be engaged by the feet of the person riding upon the sled. Rigidly connected with said lever 11 and extended rearwardly to pivotally engage the central slat of the top 1 of the sled is a link or bar 12, in this instance consisting of two parallel strips 13, said strips being pivoted to the top 1 by means of a rivet or other device 14.

It will now be seen that in order to guide the sled one end or other of the lever 11 is pressed forward, which will thereby move the cross-bar 5 longitudinally, and so bend the runners 8 and guard-rails 4 in the same direction. This will cause the sled to follow a curved path toward one side or the other, according to which end of the lever 11 is pressed upon.

In order to prevent the runners of the sled from sliding sidewise and to make the curve of the runners when bent more effective in guiding the sled, I provide the T-shaped angle-irons or runners 10 with longitudinal recesses or grooves 15, which do not occupy the whole width of the runners, but leave flat marginal surfaces 16, as indicated in Fig. 2. It will be seen that the weight of the rider will tend to force the flat surfaces 16 slightly into the snow or other surface over which the sled is passing, thereby causing ridges to be formed corresponding to the recess 15. This will, in effect, constitute a kind of track which will guide the runners more surely in the path intended, and thereby cause the sled to be much more easily controlled. Owing to the manner of connecting the runners to the side rails or bars of the sled, the same are bent for substantially their whole length when the lever 11 is operated, and thus the ridge when once formed in the surface over which the sled is passing will always tend to register with the recess or groove in the runners when the sled is moving in a curved path, as well as at other times.

Having thus described my invention, it will be obvious that I may make various changes in the form and arrangement of the details of my invention without departing from the spirit and scope thereof, and I do not wish to be limited to any particular form of recess or groove for the runners; but

What I claim, and desire to protect by Letters Patent of the United States, is—

1. In a sled, the combination with laterally-bendable runners having flat bearing-surfaces with grooves therein, of bendable side rails connected therewith, and benches attached to said guard-rails.

2. In a sled, the combination with laterally-bendable runners, having flat bearing-surfaces and grooves, of bendable side rails attached to the forward ends of said runners, benches or cleats connected with said side rails, and a top rigidly attached to one or more of said benches but resting slidably upon one of said benches.

3. In a sled, the combination with laterally-bendable runners having flat bearing-surfaces and grooves, of bendable side rails connected with said runners, cleats or benches connecting said side rails, and a top composed of slats attached to some of said benches.

4. In a sled, the combination with laterally-bendable runners having flat bearing-surfaces and grooves, of bendable side rails connected with said runners, cleats or benches connecting said side rails, and a top composed of slats rigidly attached to the rear benches but resting slidably upon the forward bench.

5. In a sled, the combination with laterally-bendable runners having flat bearing-surfaces and grooves, bendable side rails connected with said runners at their forward ends, benches or cleats connecting said rails, two supports for each of said rails connected to two of said benches, another bench serving as a stay or brace.

6. In a sled, the combination with laterally-bendable runners having flat bearing-surfaces and grooves, bendable side rails connected with said runners at their forward ends, benches or cleats connecting said rails, and two supports for each of said rails attached to forward and rear benches, a central bench serving as a stay or brace.

7. A sled having runners provided with surfaces which are flat in a horizontal plane at their outer edges, concaved or recessed central portions, for the purpose described, and slats attached to the central and rear benches but resting slidably on the forward bench.

In testimony whereof I have hereunto set my hand this 30th day of November, A. D. 1904.

SAMUEL L. ALLEN.

Witnesses:
WM. H. ROBERTS,
EDW. W. VAILL, Jr.